B. W. FORREST.
COTTON CHOPPER.
APPLICATION FILED APR. 19, 1917.

1,234,002.

Patented July 17, 1917.

Witnesses
E. K. Reichenbach.
J. W. Sherwood

Inventor
B. W. Forrest.
By Franklin D. Hough
Attorney

UNITED STATES PATENT OFFICE.

BEDFORD W. FORREST, OF SHELBYVILLE, TENNESSEE.

COTTON-CHOPPER.

1,234,002.  Specification of Letters Patent.  Patented July 17, 1917.

Application filed April 19, 1917. Serial No. 163,254.

*To all whom it may concern:*

Be it known that I, BEDFORD W. FORREST, a citizen of the United States, residing at Shelbyville, in the county of Bedford and State of Tennessee, have invented certain new and useful Improvements in Cotton-Choppers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The present invention relates to agricultural machinery and particularly to machines known as cotton choppers.

The primary object of the invention is the provision of means on a cultivator for protecting the plants from the action of the chopping blades during the cultivating operation.

A further object is the construction of such means which will be adjustable to accommodate one or more stalks.

Figure 1:
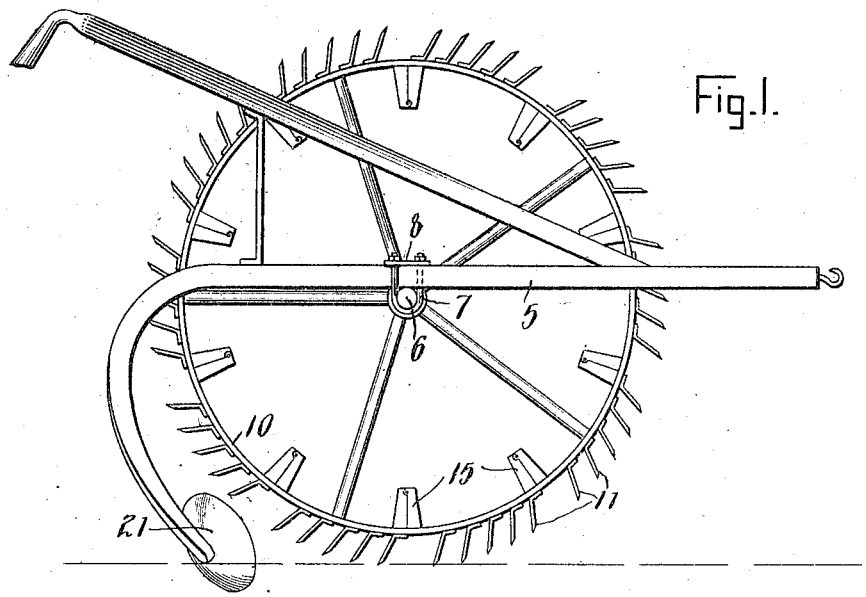
Figure 2:
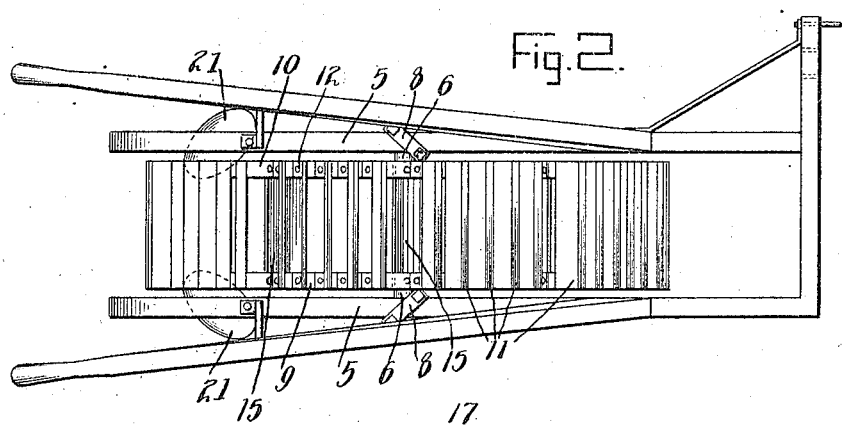
Figure 3:
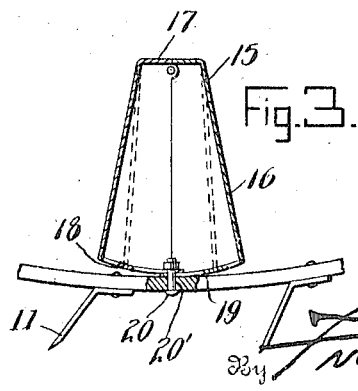

In the drawing, Figure 1 illustrates a side elevational view of a cotton chopper constructed in accordance with the invention. Fig. 2 is a top plan view and Fig. 3 is a detail view of one of the protecting cups.

Reference now being had to the details of the drawing by number 5 indicate the side beams of the frame, spaced apart by the axle 6, which is secured to the side beams by means of the U bolt 7 passing around the axle 6 and having its ends connected by a plate 8. It will therefore, be seen that the axle is adjustable along the side beams 5.

The wheel sections 9 and 10 are held in spaced relation by the chopping blades 11 arranged around the periphery of the wheel sections and secured thereto by means of bolts 12 passing through lugs 13 and 14 formed adjacent the ends of the respective blades.

Arranged at predetermined intervals within the area of the wheel sections 9 and 10 and spanning the space therebetween, are the adjustable protecting cups 15, each of which comprises side sections 16 having end portions 17, the side sections being pivotally connected together to allow one side section to move within the other, to permit the area of the cups to be varied to accommodate one or more plants.

The opposite ends of the sections 16 are open and are provided with overlapping flanges 18 on opposite sides thereof, the flanges being provided with elongated openings 19 which accommodate bolts 20 and tightening nuts 20 and it is obvious that by this construction the sections 9 and 10 may be held in their various positions of adjustment.

The rear ends of the beams 5 extend rearwardly and downwardly and support cultivating disks 21. It will, therefore, be seen that these cultivating disks may be adjusted with relation to the choppers 11, by moving the U bolt 7 along the beams 5.

In the operation of the device the machine is placed at one end of a row of cotton plants. It is then drawn over the row, with the result that the blades 11 chop out certain plants between the protecting cups 15 which house certain plants, as the machine passes thereover, and prevent dirt or stones being thrown over the same which might break the stalks thereof or otherwise harm their growth.

What I claim:

In a cotton chopper, a frame, wheel sections supporting the frame, chopping blades connecting the wheel sections, adjustable protecting cups carried by the wheel sections, each cup comprising sections hinged together at one end thereof and means adjacent the other end thereof for securing the sections in their positions of adjustment.

In testimony whereof I hereunto affix my signature in presence of two witnesses.

BEDFORD W. FORREST.

Witnesses:
E. B. MAUPIN,
O. FOGH.

Copies of this patent may be obtained for five cents each, by addressing the "Commissioner of Patents, Washington, D. C."